United States Patent [19]

Borlinghaus

[11] 4,120,489
[45] Oct. 17, 1978

[54] DOUBLE TRUNCOCONICAL SPRING OF WIRE WITH CIRCULAR CROSS SECTION

[75] Inventor: Arthur Borlinghaus, Berghausen, Germany

[73] Assignee: Bebrueder Ahle, Karlsthal Post Berghausen, Germany

[21] Appl. No.: 346,531

[22] Filed: Mar. 30, 1973

Related U.S. Application Data

[63] Continuation-in-part of Ser. No. 48,348, Jun. 22, 1970.

[51] Int. Cl.² .............................................. F16F 1/04
[52] U.S. Cl. ................................................. 267/61 R
[58] Field of Search ..................................... 267/61 R

[56] References Cited

U.S. PATENT DOCUMENTS

| 176,174 | 4/1876 | French ............................... 267/61 R |
| 380,651 | 4/1888 | Fowler et al. .................... 260/302 E |
| 1,234,636 | 7/1917 | Craven .............................. 267/61 R |
| 1,751,261 | 3/1930 | Wilson ................................... 267/62 |

*Primary Examiner*—James B. Marbert
*Attorney, Agent, or Firm*—Burgess, Dinklage & Sprung

[57] ABSTRACT

A double truncoconical spring of wire having a circular cross section, said spring having a coil diameter which is greatest in the middle portion of the spring and in which, under maximum load the coils of one half of the spring lie inside one another in the form of a spiral, and which has a linear or partially linear and partially progressive characteristic, said double truncoconical spring constructed of wire having a diameter which is greatest in the middle portion of the spring which diameter diminishes towards both ends of the spring, diminishing in a ratio such that the condition of maximum stress is fulfilled for each coil and in the case of a partially progressive characteristic, as loading upon the spring increases, the inner coils position themselves against the bearing surfaces at the ends of the spring.

1 Claim, 5 Drawing Figures

DOUBLE TRUNCOCONICAL SPRING OF WIRE WITH CIRCULAR CROSS SECTION

CROSS REFERENCE TO RELATED APPLICATIONS

This application is a continuation-in-part of Application Ser. No. 48,348 filed June 22, 1970 entitled TRUNCOCONICAL SPRING WITH A LINEAR OR PARTIALLY LINEAR AND PARTIALLY PROGRESSIVE CHARACTERISTIC.

BACKGROUND OF THE INVENTION

1. Field of the Invention

This invention is directed to a truncoconical spring. More particularly, this invention is directed to a double truncoconical spring of wire with a circular cross section in which the coil diameter of the spring is greatest in the middle portion of the spring and in which at maximum load the coils of one half of the spring lie within one another in the form of a spiral and which has a linear or partially linear and partially progressive characteristic.

2. Discussion of Prior Art

Truncoconical springs, in which the coils at maximum load line inside one another in the form of a spiral, are in the prior art. In comparison with cylindrical coil springs they have the advantage of lower structural height, especially in the fully collapsed spring in which the structural height is the same as the wire diameter.

Double truncoconical springs are also in the prior art. In comparison with springs having the shape of a single frustum of a cone they basically have the advantage that a better utilization of space and material can be achieved with them. This is to be attributed to the fact that, in the double truncoconical spring the two dead end coils have a small diameter and thus require a small volume of material. Due to the double utilization of the space between the maximum spring diameter and the minimum spring diameter, the outside diameter of the spring also becomes smaller than the outside diameter of a spring of the same characteristic having the form of a single frustum of a cone.

In spite of these advantages, double truncoconical springs hitherto have found very few applications because they have a number of serious disadvantages which have not been overcome until now.

Initially, the requirement that the coils lie inside one another and the requirement that the spring have a certain characteristic cannot be simultaneously satisfied. The double truncoconical spring, therefore, if the smallest possible coil diameter and minimal weight are also to be achieved, has a typical progressive characteristic which is unsuited to most of the practical applications involved.

Another important disadvantage of the known springs of this kind lies in poor utilization of material. The efficiency of material utilization in a helical spring is expressed, under otherwise equal conditions, by the formula:

$$V \approx \frac{1}{\tau^2}.$$

V represents the volume of the material and $\tau$ the torsional stressing of the particular coil. Since the volume is proportional to the diameter of the coil and proportional to the square of the wire diameter, it follows that the efficiency of material utilization of a truncoconical spring or of a double truncoconical spring diminishes very greatly as the coil diameter decreases, doing so as the square of the ratio of the largest coil diameter to the smallest. In practice, this means that a spring in which the ratio of the largest coil diameter to the smallest coil diameter is 5:1, and in which the efficiency of material use is virtually optimum at the largest coil diameter, in the smallest coil diameter the efficiency of material use will amount to only 1/25th. Therefore, in all coils which are smaller than the largest, the material utilization is imperfect, and if optimum material use were achieved the spring would have a substantially smaller volume of material and thus also a substantially lighter weight, and, as a further consequence of a the greater efficiency of material use, it would have a small number of turns and a smaller outside diameter.

Another serious disadvantage of the prior-art double truncoconical springs having a progressive characteristic consists in the fact that, when the spring is fully collapsed, the coils with the greatest diameter located in the middle of the spring are the first to be neutralized. This makes the spring entirely unsuitable for most constructional purposes, because the coils that are the first to be neutralized have no clearly defined bearing. Consequently the tensions in the material may be exceeded and the life of the springs may be shortened. In addition, spring coils freely oscillating in the center of the spring cause considerable noise, which has hitherto made the use of such springs impossible, for example, in motor vehicle construction.

SUMMARY OF THE INVENTION

The problems attendant to the prior art double truncoconical springs are solved, pursuant to the invention, by a double truncoconical spring having wire of circular cross section said spring having the coil diameter of greatest dimension in the middle portion of said spring, and in which, under maximum load, the coils of one half of said spring, lie inside one another in the form of a spiral, said spring having a linear or partially linear and partially progressive characteristic, said spring constructed of wire whose diameter is greatest in the middle portion of said spring and diminishes towards both ends of said spring in a ratio such that the condition of maximum stress is fulfilled for each coil and in the case of a partially progressive characteristic, as loading increases, the inner coils of said spring, lay themselves against the bearing surfaces at the ends of said spring.

It will be seen from the disclosure below that the spring of the present invention is particularly addressed to the problem of creating a double truncoconical spring of the type mentioned above in which optimum material utilization is achieved with great control over the characteristic curve, while at the same time the above-mentioned disadvantages are eliminated. Thus, pursuant to the invention the wire has its diameter of greatest dimension through the coil of the spring having the greatest diameter disposed in the middle of the double truncoconical spring. The wire diameter is of a circular cross section and decreases towards both ends of the spring in a ratio such that the condition of maximum stress is fulfilled in each coil, and in the case of a partially progressive characteristic as the loading increases, the coils are laid against the surfaces at each spring end.

It should be understood that the double truncoconical springs of the present invention are so constructed that upon maximum load, the coils of each succeeding coil from the center to either end of the spring will lie within the coil closest to the coil at the middle region of the spring. Stated differently, each succeeding coil from the middle coil of the spring will have an outside diameter less than the inside diameter of the coil in juxtaposition therewith towards the center or middle region of the double truncoconical spring. Thus, a common tangent line running in vertical direction at the inside of the coils will not be parallel to a line drawn vertically through the spring itself. Rather the tangent line connecting the coils will intersect the vertical line drawn through the vertical plane of the spring. Thus, the truncoconical spring of the present invention is a double truncoconical spring in which the truncoconical shape is caused other than by varying the wire thickness from the middle portion of the spring toward each exterior or remote end. Thus, by so constructing the spring in a true double truncoconical form wherein the outside diameter of each spring towards the spring ends is less than the inside diameter of the coil toward the middle region thereof, there is provided a spring in which, in fully collapsed form under maximum load, the coils will apply themselves to the bearing surface at each end thereof. According to the invention, there can also be provided that the coils will apply themselves to the bearing surface at only one end of the spring, if desired.

DESCRIPTION OF SPECIFIC EMBODIMENT

Figure 1:
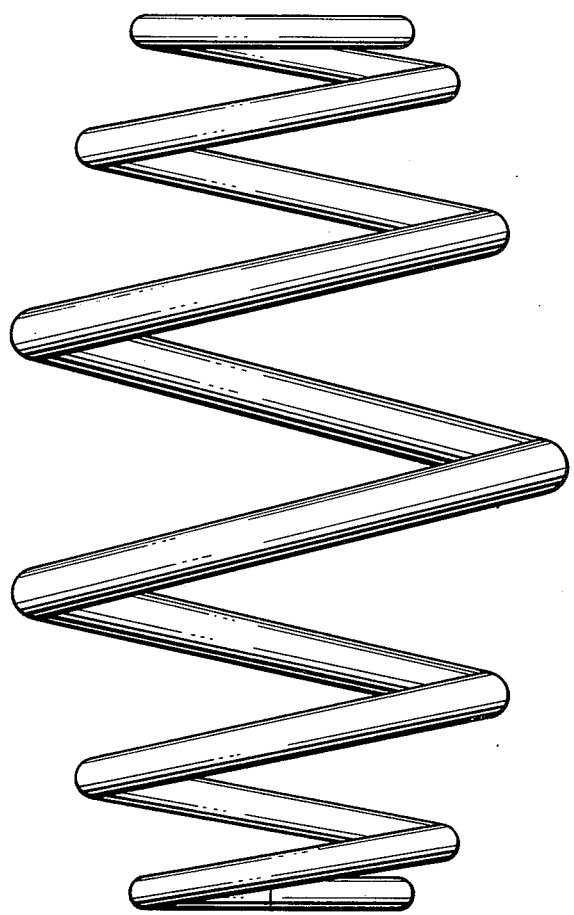
FIG. 1 shows a side view of a double truncoconical spring, said spring having a partially progressive characteristic.
Figure 2:
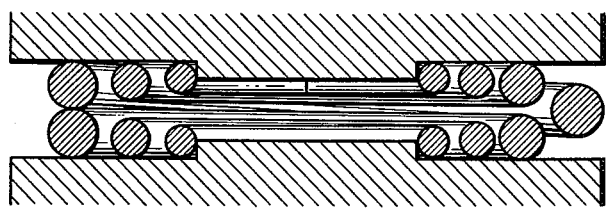
FIG. 2 is a cross-sectional view of the spring of FIG. 1 in the fully compressed state. This Figure shows the bearing surfaces and the coils of the spring of FIG. 1 in contact with such bearing surfaces.
Figure 3:
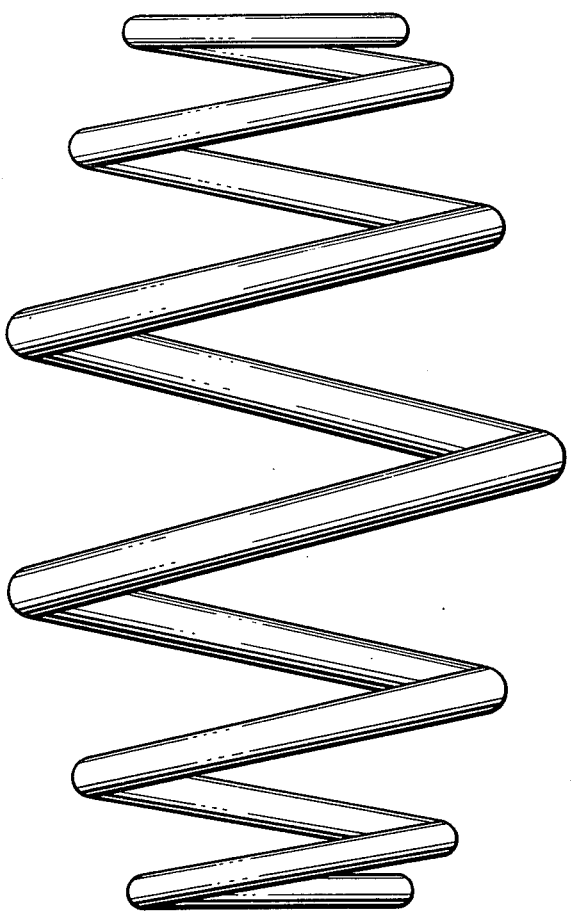
FIG. 3 shows a side view of a double truncoconical spring, said spring having a linear characteristic.
Figure 4:
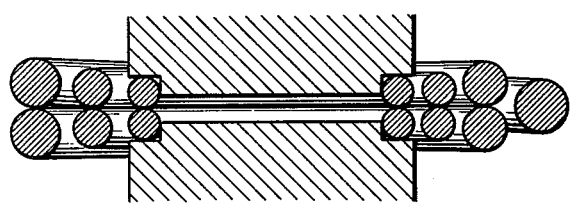
FIG. 4 is a cross-sectional view of the spring of FIG. 3 in the fully compressed state.
Figure 5:
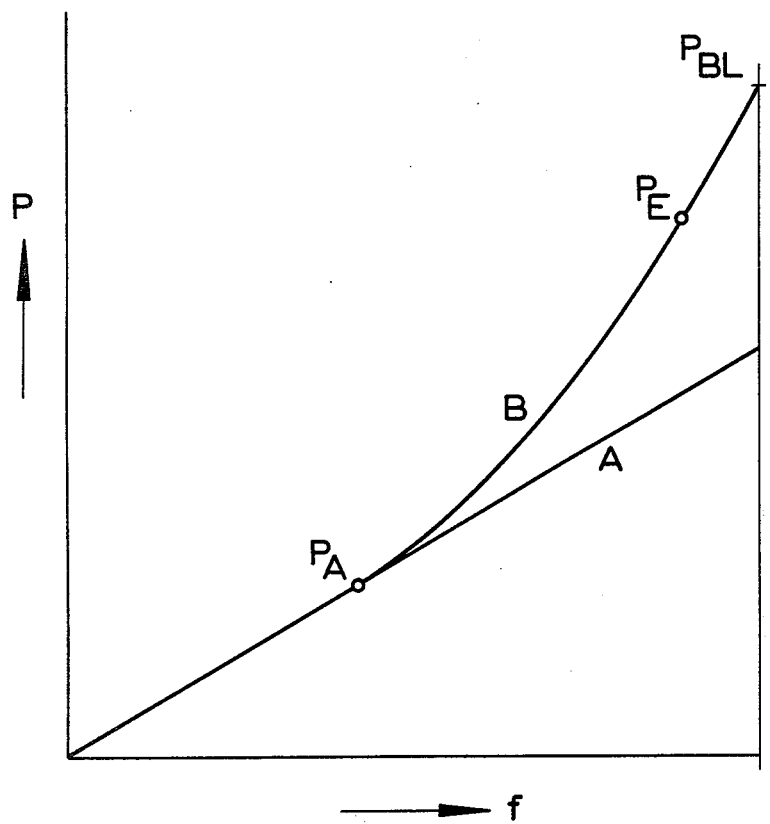
FIG. 5 is a graphical presentation of the two characteristics of the double truncoconical springs shown in the FIGS. 1 and 2 on one hand and in the FIGS. 3 and 4 on the other hand. The characteristic A in FIG. 5 is linear while the characteristic B is partially progressive, i.e., it is linear in the portion up to point PA, progressive in the portion from PA to PE, and linear again in the portion from PE to PBL, i.e., up to the point of full collapse. Thus, the spring shown in the FIGS. 1 and 2 has a characteristic like B and can be characterized as one which is linear-progressive-linear in characteristic.

A specific and preferred embodiment of the present invention can be seen from the next drawings wherein it is seen that the springs consist of wires of inconstant diameter, both the wire diameter and the succeeding coil diameters of the spring diminishing from the middle of the spring towards both ends. Upon loading to the maximum, in the case of the spring corresponding to FIGS. 1 and 2 and having the partially progressive characteristic B of FIG. 5, the coils lay themselves largely against the two planes of both ends of the spring and in this manner cause the curving of the characteristic of FIG. 5. Specifically, when the spring of FIGS. 1 and 2 is disposed between opposed bearing surfaces and the spring is collapsed under maximum stress, the smaller coils lie within the inside diameter of the larger coils as seen in FIG. 2. These inner coils are caused during full collapse of the spring to abut the bearing surfaces. Indeed, when such a spring is collapsed, the coils of greater diameter on either side of the middle portion of the spring are caused to abut the bearing surface. Perhaps the only spring coil which remains in out of contact relationship with the bearing surface is the middle coil of the spring. However, it should be understood that depending upon the number of coils employed that even those coils can, in an appropriate double truncoconical spring, be made to abut the bearing surface.

As it may be seen in FIG. 2, the height of a fully collapsed double conical spring is slightly greater than it is in the case of a corresponding spring in the form of a single frustum of a cone. This is to be attributed to the fact that in the double truncoconical spring there can be two coils of each diameter. The length of the fully collapsed spring and the outside diameter are nevertheless substantially smaller than in a spring of the same characteristic in the form of a cylindrical, compression-type helical spring. In addition, it has been found on the basis of comparative calculations that in the double truncoconical spring not only is the material utilization in all of the live coils just as efficient as in the case of a spring in the form of a single frustum of a cone, but also the abovementioned advantages over the spring in the form of a single frustum of a cone are obtained.

This is shown by the following table I:

Table I.

|  |  | Cylindrical, compression-type helical spring | Spring made of wires of inconstant diam. | |
|---|---|---|---|---|
|  |  |  | Truncoconical | Double Truncoconical |
| Ex. 1 | $D_a$ (mm diam.) | 90 | 221 | 156.5 |
|  | $L_B$ (mm) | 119.5 | 11.55 | 21 |
|  | Finished weight (kg) | 1.715 | 1.700 | 1.400 |
| Ex. 2 | $D_a$ (mm diam.) | 230 | 297.5 | 208.5 |
|  | $L_B$ (mm) | 93.5 | 16.23 | 29.00 |
|  | Finished weight (kg) | 6.440 | 4.420 | 3.8 |

In the above table the properties of a cylindrical, compression-type helical spring, of a spring in the form of a single frustum of a cone, and of a double truncoconical spring are shown for comparison. The outside diameter ($D_a$), the fully collapsed height ($L_B$) and the weight are given for each spring. The springs have the same characteristic and the same stress rating.

As it appears from the table I, the double truncoconical spring offers great advantages over the cylindrical helical compression spring in regard to fully collapsed height and weight, and over the spring in the form of a single frustum of a cone as regard outside diameter and weight. The weight saving increases as the diameter of the cylindrical helical compression spring increases.

Table II shows the advantages of a double truncoconical spring of the present invention over a double truncoconical spring made of wire of constant diameter.

Table II.

|  |  | Spring made of wire of constant diam. | Spring made of wire of inconstant diam. |
|---|---|---|---|
| Example 3 linear characteristic (A) | $D_{a_{max}}$ (mm): | 185 | 151 |
|  | d (mm): | 13 | 12.10 to 8.95 |
|  | $L_B$ (mm): | 26.00 | 23.50 |
|  | Finished weight: (kg) | 3.111 | 1.695 |
| Example 4 partly progressive characteristic (B) | $D_{a_{max}}$ (mm): | 232 | 164 |
|  | d (mm): | 15.50 | 14.18 to 9 |
|  | $L_B$ (mm): | 31.00 | 27.40 |
|  | Finished weight: (kg) | 6.087 | 2.110 |

In table II the maximum outside diameter ($D_{a_{max}}$), the wire diameter (d), the fully collapsed height ($L_B$) and the weight are given for each spring. The springs have the same characteristic and the same stress rating.

As it appears from table II the double truncoconical spring made of wire of inconstant diameter offers great advantages over the double truncoconical spring made of wire of constant diameter in regard to the outside diameter, to fully collapsed height and especially to weight. The weight saving is 45% in the case of example 3 and 65% in the case of example 4.

The calculation of a double truncoconical spring is carried out in several steps because of the changes of coil diameter and wire diameter. Known principles and formulas are used. (See for instance: A. M. Wahl "Mechanical springs" McGraw-Hill Book-Co. New York 2nd Ed. 1963; or: "Springs, materials design manufacture" published April 1969 by Spring Research Association G.B.) In the case of a spring with a linear characteristic the given values are minimum coil diameter, maximum spring power, spring rate, entire spring path and maximum stress. The spring is considered to be divided into several sections and for each section an average wire diameter, a spring path and a spring rate is calculated.

If the spring has a progressive characteristic in an approximation the characteristic is divided into small sections having a linear characteristic, and for each section the above mentioned calculations are carried out.

It has been found that the double truncoconical spring of the invention, in addition to the above-mentioned advantages, also represents an additional advance in regard to production techniques. Double truncoconical springs are generally made on special automatic spring winding machines. The special shape of the double truncoconical spring makes it impossible to wind the wire on a mandrel and then pull it off as is done in the manufacture of cylindrical springs. One reason lies in the fact that the tangent line through the spring and touching the coils on the inside is not parallel with a vertical line drawn through the center of the spring. Double truncoconical springs are therefore wound without a mandrel. At the end of each winding procedure the wire is cut off at the end of the last coil wound.

It has been found that this severing of the wire at the end of the last coil with the usual cut-off tools is possible only when the smallest coil diameter of the spring is at least as large as five times the wire thickness. This is because in the cut-off operation a tool always has to be introduced into the interior of the spring. The thickness of this tool must, of course, be smaller than the smallest coil diameter. If the wire thickness becomes greater than the above-stated ratio, the stability of the inserted tool is no longer sufficient for the severing of the wire. From this it follows that the smallest coil diameter of a double truncoconical spring is greatly dependent on the wire thickness, for reasons of practical production.

In the case of a double truncoconical spring which is wound from a wire with a constant thickness of 16 mm, the smallest outside diameter of a coil must not, according to this equation, be smaller than 80 mm. If the double truncoconical spring, however, is wound from a wire whose thickness at the largest coil diameter amounts to 16 mm, and whose thickness at the two smallest end coils amounts to only 10 mm, the diameter of the smallest end coils needs to amount to only 50 mm.

It is to be noted also, if a certain characteristic is to be produced in a spring, that the greater the diameter of the smallest end coils must be, the greater will be the thickness of the wire that must be used. Consequently, in the case of a double truncoconical spring of constant wire thickness compared with a double truncoconical spring of the invention, the difference between the maximum coil diameters is substantially greater than the difference between the smallest coil diameters. The double truncoconical spring of the invention may thus have substantially smaller dimensions for the same specifications, and this is a very special advantage in many applications. The double truncoconical springs of the present invention are particularly suitable as chassis springs for motor vehicles. Here, they efficiently utilize the material of the spring and can be made of appropriate dimensions where they function at the highest material efficiency. In the springs of the present invention, it is seen that the two non-springing terminal coils have a smaller diameter and therefore require less material than in a standard double truncoconical spring made of a wire having a constant diameter. Moreover, since double use is made of the space between the largest spring diameter and the smallest spring diameter, the outside diameter of the spring also becomes smaller in comparison to the outside diameter of a single acting spring which has the same characteristic and is constructed as a simple, uni-directional truncated cone. The maximum utilization of space is provided by the assembly which allows the coils of increasing diameter to be folded over the coils of lesser diameter so as to abut the bearing surfaces at full compression or collapse.

In addition to the above recited advantages that optimum material utilization is achieved by the double truncoconical springs of the present invention. The springs according to the invention offer the additional advantage that, all other properties being equal, i.e., the spring rate or characteristic, and the spring excursion being the same, the profile of the spring is substantially lower than that of the springs of the prior art. This feature makes it possible to use these springs in motor vehicles and rail vehicles. In vehicle manufacture, it is often important to use springs of the lowest possible profile, because, in the first place, very little room is usually provided for the springs, and in the second place, the reduction of the height of the spring profile makes it possible to lower the floor of the vehicle in relation to the axles thereof thereby to create more space inside the vehicle for passengers or freight. As seen in FIG. 2, the fully compressed spring of FIG. 1 occupies a minimum of space thereby allowing more space for the passengers or freight. Thus, the springs of the present invention are especially useful in motor vehicle wheel suspensions, as for example, in shock absorbers or transverse, longitudinal or diagonal rods. In vehicles, especially those subject to severe vibration, a good spring mounting must also be provided for the seats, especially the driver's seat. Such spring mountings, however, take up much otherwise usable springs of the present invention, therefore, can be advantageously used for seats in vehicles, especially in agricultural vehicles and other off-the-road vehicles, heavy trucks, lift-trucks or military combat vehicles. In the case of rail vehicles, the car frame is suspended on the wheel axle journals with springs. The height of the springs used for this purpose unfavorably affects the height of the bottom of the car above the top of the rail. The springs of the invention are used in the axle suspension or the bogie trucks of rail vehicles, the height of the car body above the top of the rail can be reduced.

In the air brakes used in motor vehicles, spring loaded compressed-air brake cylinders are often used, which have the advantage but if the source of compressed air fails, the brake will automatically be spring applied. The use of the springs in the cylinders has, in the past, increased for structurally length. Advantageously, the use of the springs of the invention in this application make it possible to shorten the length of these cylinders.

In continuous speed reducers, the dimensions of the belt pulleys, which as a rule consist of two conical parts forced against one another by springs, can be considerably reduced.

What is claimed is:

1. A double truncoconical spring made of wire having a circular cross section, the coil having the greatest diameter being toward the middle of the spring, the coils of one half of said spring, under maximum load, being positioned inside one another in the form of a spiral, said spring having a partially progressive characteristic, said spring composed of wire whose diameter is greatest in the middle of the spring and whose diameter diminishes towards both ends of the spring in a ratio such that the condition of maximum stress is fulfilled for each coil and, as loading increases, the inner coils lay themselves progressively against the bearing surfaces at the ends of the spring.

* * * * *